United States Patent [19]
Petkovic

[11] Patent Number: 6,037,728
[45] Date of Patent: Mar. 14, 2000

[54] ELECTRICAL BRAKING AND ENERGY STORAGE FOR MOVING VEHICLES

[76] Inventor: Peter M. Petkovic, 6360 N. Paulina St., Chicago, Ill. 60660

[21] Appl. No.: 09/280,317

[22] Filed: Mar. 29, 1999

[51] Int. Cl.[7] ................ H02P 5/04; H02P 5/20
[52] U.S. Cl. ............. 318/364; 318/139; 318/146; 318/806
[58] Field of Search ............. 318/46–89, 140–159, 318/364–375, 723, 721, 805, 806, 799, 809; 320/40, 17, 43, 48; 364/483

[56] References Cited

U.S. PATENT DOCUMENTS

| | | | |
|---|---|---|---|
| 3,806,785 | 4/1974 | De Valroger et al. | 318/254 |
| 4,186,333 | 1/1980 | Kremer . | |
| 4,313,080 | 1/1982 | Park | 320/61 |
| 4,316,132 | 2/1982 | Geppert | 318/723 |
| 4,330,742 | 5/1982 | Reimers . | |
| 4,363,999 | 12/1982 | Preikschat | 318/53 |
| 4,394,741 | 7/1983 | Lowndes | 364/483 |
| 4,427,928 | 1/1984 | Kurijama et al. . | |
| 4,433,278 | 2/1984 | Lowndes et al. | 320/48 |
| 4,484,130 | 11/1984 | Lowndes et al. | 320/40 |
| 4,495,449 | 1/1985 | Black et al. | 318/60 |
| 4,671,577 | 6/1987 | Woods . | |
| 4,908,553 | 3/1990 | Hoppie et al. . | |
| 5,027,048 | 6/1991 | Masrur et al. | 318/806 |
| 5,030,898 | 7/1991 | Hokanson et al. | 318/146 |
| 5,081,365 | 1/1992 | Field et al. | 290/45 |
| 5,163,170 | 11/1992 | Grabowski | 318/113 |
| 5,172,006 | 12/1992 | Suzuki et al. | 290/45 |
| 5,350,985 | 9/1994 | Konrad et al. . | |
| 5,428,551 | 6/1995 | Trainor et al. . | |
| 5,466,998 | 11/1995 | Kinoshita et al. . | |
| 5,578,911 | 11/1996 | Carter et al. . | |
| 5,642,023 | 6/1997 | Journey . | |

*Primary Examiner*—Paul Ip
*Attorney, Agent, or Firm*—Richard G. Kinney

[57] ABSTRACT

A system for electrical braking and the storage for reuse of the braking energy is disclosed using alternating current (AC) rather than direct current (DC) generators coupled to the wheels of the vehicle to be braked. Upon braking, the AC generators feed the primary coil of a transformer whose secondary coil can be tapped at one of a number of different turns. Means are provided for changing the tap points so as to increase the number of turns in the secondary as the speed of the braked wheel declines. The output from the secondary is fed to a rectifier and thereafter the direct current is fed to a battery energy storage device. By increasing the turns of the secondary as the wheel speed drops, more energy can be fed and stored in the battery and the range of effective braking by the alternating current generator can be extended to lower speeds.

5 Claims, 2 Drawing Sheets

6,037,728

ELECTRICAL BRAKING AND ENERGY STORAGE FOR MOVING VEHICLES

FIELD OF THE INVENTION

The present invention relates to electrical braking and energy storage for wheeled vehicles.

BACKGROUND OF THE INVENTION

Conventional vehicles are stopped by means of conventional brakes such as disc brakes or drum brakes which are essentially two surfaces rubbing against each other. When stopping, the mechanical energy of the vehicle is completely converted to heat. Conventional automobiles, buses and trucks currently use such mechanical braking almost exclusively.

Electrical braking has been proposed, (mainly for railroad engines) however, which uses a direct current (DC) generator to slow down and stop a vehicle. These systems often employ an electrical load, such as a resistor, to dissipate the electrical energy as heat, or a battery to store the electrical energy. The electrical load at the output of the DC generator is translated as a mechanical counter torque which is in opposition to the direction of shaft rotation. Electrical resistance is converted to mechanical resistance.

The reverse is true for an electric motor. The greater the mechanical load placed on its rotating shaft (counter-torque), the greater the current that is drawn from the electric power supply. The law of conservation of energy must be obeyed, and there are slight losses as heat for both the generator and the motor.

Examples of electrical braking and battery storage can be found in the following references:

| | | |
|---|---|---|
| 5,642,023 | J. C. Journey | June 24, 1997 |
| 5,578,911 | J. C. Carter, et al. | November 26, 1996 |
| 5,466,998 | S. Kinoshita, et al. | November 14, 1995 |
| 5,350,985 | H. Konrad, et al. | September 27, 1994 |
| 4,908,553 | L. O. Hoppie, et al. | March 13, 1990 |
| 4,671,577 | D. H. Woods | June 9, 1987 |
| 4,427,928 | S. Kuriyama, et al. | January 24, 1984 |
| 4,330,742 | E. Reimers | May 18, 1982 |
| 4,186,333 | M. Kremer | January 29, 1980 |

Also of possible interest is U.S. Pat. No. 5,428,551 to J. T. Trainor, et al. (issued: Jun. 27, 1995).

In such prior art electric braking DC electric energy often charges the battery. In such systems a problem exists in that when the brake switch is applied and the vehicle starts to slow down (because the battery is an electrical load) generator voltage decreases. When generator voltage drops down to battery voltage, the battery won't charge anymore. The energy capacity (voltage times current times time) is still present in the generator, but it cannot enter the battery, because battery charger voltage must be greater than battery voltage in order to charge it.

The other alternative is to use a generator with a voltage rating much higher than battery rated voltage at the driving speed right before the brakes are applied. The reasoning is that when the vehicle has slowed down to almost a complete stop, generator voltage is still slightly higher than battery voltage, conserving all of the energy into the battery. Unfortunately, this method presents a real physical hazard: extremely high current forced into the battery can severely shorten the battery's life, or it can cause a physically dangerous situation such as a battery explosion.

There is thus a need for a system that prevents the stopping of battery charging at a slow speed (wasting energy) or quickly overcharging the battery (physically dangerous). In other words, there is a need to keep generator voltage slightly higher than battery voltage throughout the braking process.

SUMMARY OF THE INVENTION

The invention, together with further advantages and features thereof, may best be understood by reference to the following description taken in connection with the accompanying drawings, in the several figures of which, like reference numerals identify like elements.

DETAILED DESCRIPTION OF A PREFERRED EMBODIMENT

Figure 1:
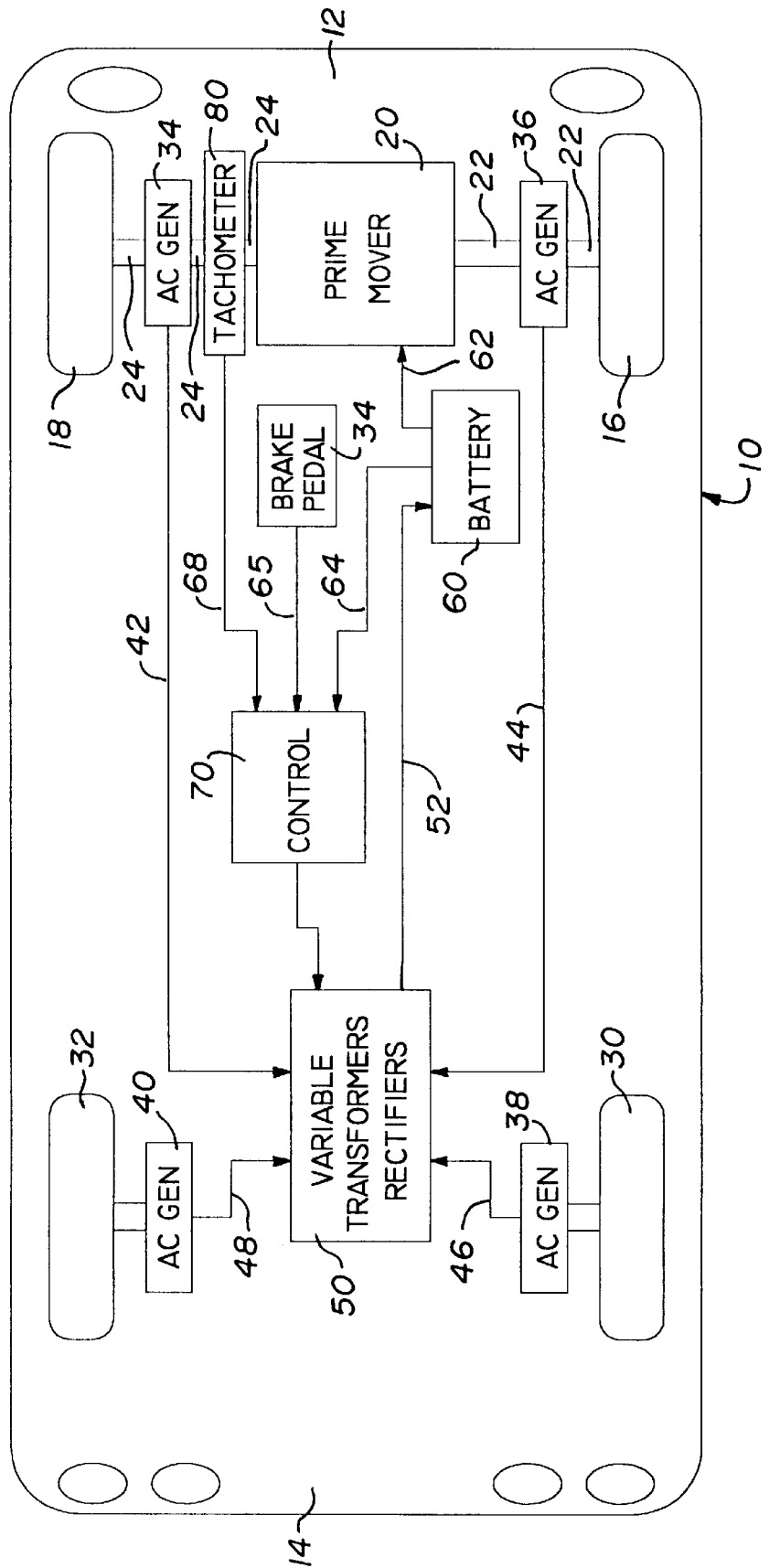
FIG. 1 is a schematic plan view of a vehicle, such as a passenger automobile, incorporating the present invention.

Referring to the drawings and initially to FIG. 1, there is depicted a vehicle 10 having a front 12 and a rear 14. The vehicle 10 has a pair of front wheels 16 and 18 mechanically driven by a prime mover 20 which may be a conventional internal combustion engine or an electric motor. The front wheels 16 and 18 are driven by a conventional drive chain including drive axles indicated schematically by shafts 22 and 24. Conventionally, means for turning the front or steering wheels 16 and 18 are provided but not shown to simplify the depiction. The vehicle 10 also has a pair of rear wheels 30 and 32. The wheels 16, 18, 30, and 32 are provided with conventional (mechanical) braking means controlled by a brake pedal 34 which means and e.g. conventional hydraulic lines are also not illustrated. These can be the same as employed in conventional passenger cars, but are designed to work in conjunction with an electric braking system of the present invention to provide back up and supplemental braking as the vehicle slows down and stops.

In accordance with the present invention, each of the wheels 16, 18, 30 and 32 are mechanically coupled to an alternating current (AC) generators 34, 36, 38 and 40. The outputs of each of these AC generators is fed, respectively, as indicated by lines 42, 44, 46 and 48 to a variable transformer and rectifier unit 50. (Shown in detail in FIG. 2.) The output of this unit 50 is a direct current voltage which is fed as indicated by the line 52 to a battery 60 which may also serve as the source of stored electrical power for the prime mover 20 as indicated by the line 62 and to provide power to a control unit 70 as indicated by the line 64. A signal developed from the brake pedal 34 is also fed, via the line 66, to the control unit 70.

In addition, the vehicle 10 includes a tachometer 80 coupled to the drive shaft 24. The tachometer 80 develops a signal proportional to the speed of the wheel 18 and feeds that signal as indicated by the line 68 to the control unit 70. Since all of the wheels of the vehicle are usually turning at the same approximate speed only one tachometer may be, for economy, engaged. However, if desired, separate tachometers may be provided at each wheel and separate controllers 70 provided for each wheel. And alternately, the AC frequency output of the AC generators could be used to devise the tachometer signal. The control unit 70 serves to control the unit 50 as best explained with reference to FIG. 2.

Figure 2:
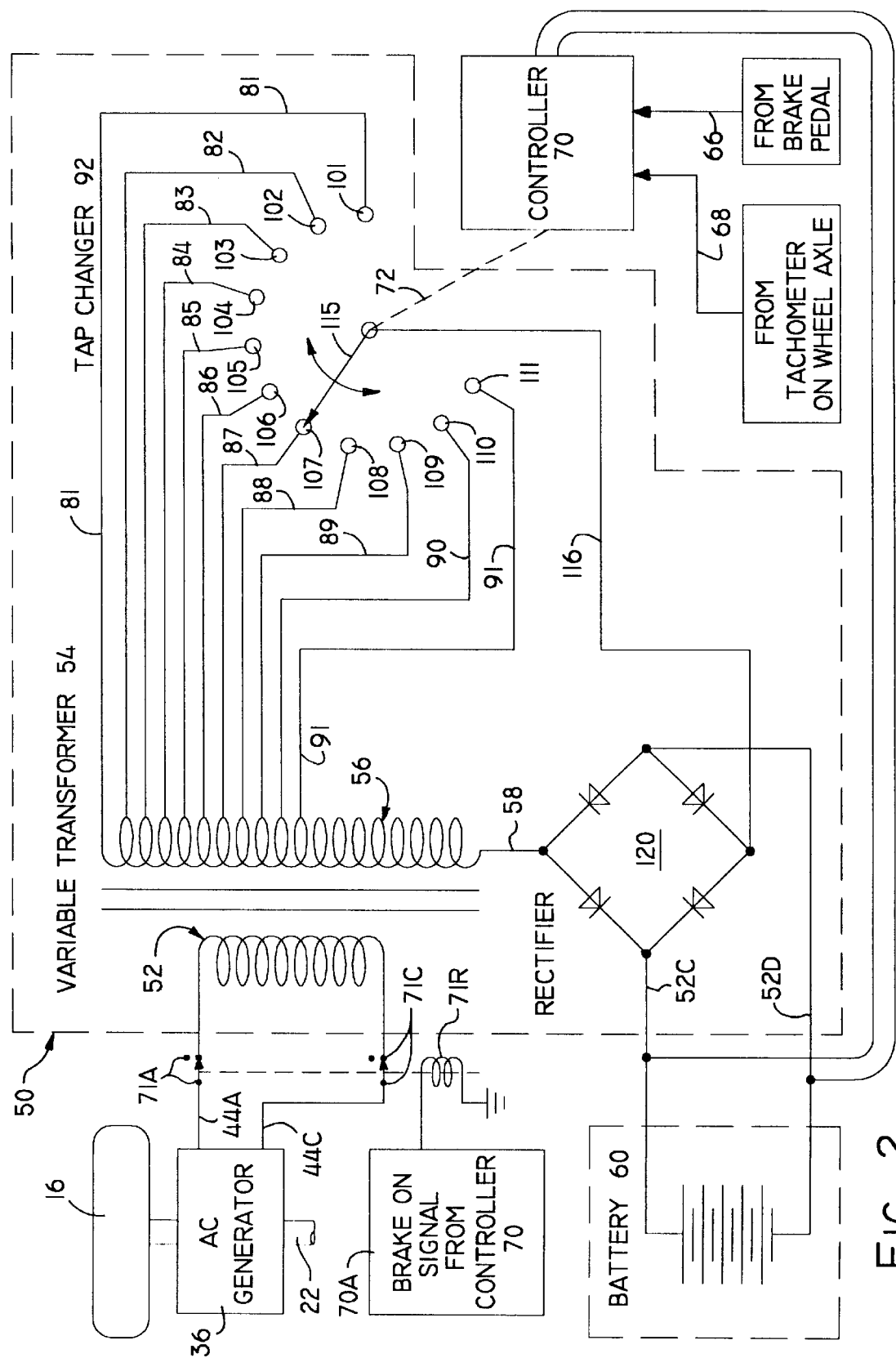
FIG. 2 is a more detailed schematic circuit diagram of a portion of the vehicle of FIG. 1 for illustrating the operation of the present invention.

In FIG. 2 only one wheel, the wheel 32 are one alternating current generators (the generator 36) are illustrated, it being understood that the arrangement for the other wheels and generators would be substantially the same. The output of the generator 36 is a sinusoidal wave produced between lines 44A and 44C. This AC power is fed by the lines 44A and 44C through a pair of relay switches 71A and 71C to an input coil 52 of a transformer 54 whose output coil 56 is tapped at one end by a line 58 and at a plurality of points along the output coil. These taps range from all of the turns of the coil at line 82 to about half of the turns at line 91 with lines 82, 83, 84, 85, 86, 87, 88, 89 and 90 in between. Each of these lines are contacted to successive points 101, 102, 103, 104, 105, 106, 107, 108, 109, 110 and 111 to tap changer 92 whose blade 115 is connected to a line 116. The relay switches 71A and 71C are normally open to deactivate the AC generator 36, but are closed upon braking by a braking signal provided by the controller 70 as indicated at 70A. This signal operates a relay coil 71R to closed switches 71A and 71C and couples the transformer 54 to the generator 36.

During braking the AC output of the transformer is presented across lines 58 and 116 and fed to a full wave rectifier 120 whose direct current output is fed between lines 52D and 52C to the battery 60.

The blade 115 of the tap changer 92 is mechanically moved, as indicated by the dashed-line 72 by the controller 70. The controller 70 is basically a speedometer driven by the signal via lines 66 and 68 from the tachometer and brake in a manner so as to have the blade 115 tap point 111 at the start of the braking and to move the blade 115 sequentially through the points 111 to 101 as the speed of the wheel drops.

On pressing the brake pedal, a back emf is presented to the AC generator 36 and provides electrical braking. That is, the AC generator 36 takes energy from the wheel and converts it into alternating current electrical energy which is fed to the input coil 52 of the transformer 54. This energy is fed from the output coil 56 to the rectifier 120 to the battery 60 were it is stored. As the speed of the wheel 16 drops, the controller moves the blade 115 progressively along the points 111–101 and thus increases the effective number of turns for the output or secondary coil 56 of the transformer 54. This increases the voltage output of the transformer to continue to feed energy to the battery. That is, at a high speed the voltage output from point 111 would produce a voltage over that of the battery 60 and thus easily transfer power from the generator 36 to the battery 60. As the speed of the wheel drops the output of the generator 36 would also fall and eventually reach a rectifier output that would no longer be able to overcome the battery 60 voltage brake level (e.g. 12+v.). Before this occurs, the blade 115 would move clockwise to a higher turn point and as the speed of the wheel drops further moved still further clockwise by the controller so as to continue to provide electrical braking to the wheel 16 and to store more energy in the battery 60. Eventually as the speed of the wheel drops still further, conventional braking is provided to completely stop the vehicle 10.

Although only one wheel and generator is shown in FIG. 2, a similar arrangement is provided for each wheel with each providing electrical output to either a separate primary coil for the transformer 54 (in which case it would have four primary coils like the coil 52 wound on the same core but only one secondary coil 56) or to a set of transformers like that transformer controlled in tandem by the controller 70. If preferred, as mentioned above, separate controller 70 and tachometers such as the tachometer 80 can be provided, one for each wheel. In any case, the AC generator provides power that is stored in the battery 60 and which can be used either directly by the prime power mover 20 (if it is an electric motor) or to operate other components of the vehicle 10.

As the brakes are applied, the electronically controlled tap changer changes the transformer's primary-to-secondary turns ratio (which is the voltage ratio) so that the transformer's secondary voltage is fairly constant while the generator's voltage is dropping. The transformer's output should be constant until the vehicle is almost completely stopped and then it should suddenly drop to zero.

Of course, this system should increase the efficiency (range-of-travel) for an electric automobile, especially in bumper-to-bumper traffic. The electric car's main battery pack can accept the braking energy directly, or the braking system can use a separate (smaller) battery, and the energy can be transferred from one battery to another by a switching mechanism.

While one embodiment of the invention have been shown and described, it will be obvious to those in the art that changes and modifications may be made without departing from the invention and, therefore, the aim in the appended claims is to cover all such changes and modifications as fall within the true spirit and scope of the invention.

For example, a resistive load can be employed either in leu of or in supplement to the rectifier and battery without departing from the spirit of the invention, at least in its broader aspects. And, although a switch blade and multi-contact mechanism is depicted for the tap changer, such may also be achieved using solid circuit switching.

I claim:

1. In a vehicle having an energy storage device and at least one turning wheel, a system for electrically braking that wheel, in response to a braking signal, comprising:

tachometer means for approximately sensing the speed of the wheel;

a variable transformer having a primary coil and a secondary coil and means for varying the primary to secondary coil turn ratio from a lower to higher value in response so said tachometer means sensed speed;

a rectifier means connected to the secondary coil of said variable transformer to receive output of said variable transformer to produce direct current energy therefrom and feeding that direct current energy to the vehicle's energy storage device;

an alternating current (AC) generator coupled to the wheel so as to generate AC output; and means for effectively connecting, in response to the braking signal, said generator to said primary coil of said variable transformer whereby said AC generator brakes the wheel and provides energy which is fed to said transformer means and to said rectifier means and stored in the energy storage device.

2. A vehicle having wheels and having an improved braking system comprising:

alternating current generator means coupled to at least one of the wheels of the vehicle which, in response to a braking command, produces an alternating current output from the spinning wheels and applies braking forces to slow the spin of said wheels;

sensing means coupled to at least one of said wheels for providing an output signal related to the speed of the wheel;

an electric storage battery;

a rectifier which may charge said battery;

variable transformer means coupled to said generator means to receive its alternating current output and provide a transformed voltage alternating current transformer output, said transformer means being also coupled to receive the output signal of said sensing means and to vary the output voltage of the transformer in response thereto to keep the voltage thereof near and above the charging level for the battery for an extended range of speeds for the braking wheel; and means for feeding the transformer output to said rectifier, whereby the voltage of the input to the battery is keep above the charging level for the battery as the speed of the wheels slows.

3. An electric braking system for a wheeled vehicle comprising:

an alternating current (AC) generator coupled to at least one wheel of the wheeled vehicle for producing alternating current electrical power and providing braking to the at least one wheel;

a variable turn ratio transformer having a primary coil for receiving an AC input and a secondary coil for producing an AC output;

an electrical load;

means for sensing the rotational speed of the at least one wheel and coupled to said transformer for varying the turn ratio of said transformer's primary to secondary coils from a relatively low number to a relatively high number in response to a decrease in the rotational speed of the at least one wheel; and means for selectively operationally connecting said transformer to said generator and for connecting said load to the output of said transformer when braking is desired.

4. The system of claim 3 wherein said electrical load includes means for storing electric power delivered to it.

5. The system of claim 3 wherein said electrical load includes a rectifier means and electric storage battery and wherein electric power derived from said generator is stored in said battery.

* * * * *